United States Patent

[11] 3,575,435

| [72] | Inventor | Savarian F. Lemanski<br>Detroit, Mich. (c/o 2148 Collins Ave., Utica, Mich. 48087) |
|---|---|---|
| [21] | Appl. No. | 732,986 |
| [22] | Filed | May 29, 1968 |
| [45] | Patented | Apr. 20, 1971 |

[54] ATTACHMENTS FOR LATHE JAWS
4 Claims, 19 Drawing Figs.

[52] U.S. Cl. .................................................. 279/123, 269/281, 269/282
[51] Int. Cl. ........................................................ B23b 31/10
[50] Field of Search .......................................... 279/1 (SJ), 1, 123; 269/268, 277, 279, 280, 281, 282

[56] References Cited
UNITED STATES PATENTS

| 2,741,145 | 4/1956 | Bahorik | 269/282X |
| 3,199,881 | 8/1965 | Duxbury | 279/123 |

FOREIGN PATENTS

| 521,489 | 1921 | France | 279/123 |

Primary Examiner—Andrew R. Juhasz
Assistant Examiner—Donald D. Evenson
Attorney—Hauke, Gifford and Patalidis ABSTRACT: A set of attachments for the chuck of an engine lathe, to assist the jaws in gripping and positioning the workpiece. The attachments disclosed include two forms of soft jaws that attach on hard jaws, a set of shims for gripping and positioning a ring-shaped workpiece on stepped jaws, two forms of stops for positioning the end of the workpiece in selected positions in the jaws, and an adapter having a friction surface and magnetic means for engaging and longitudinally supporting the end of a workpiece that cannot normally be engaged between the jaws.

Patented April 20, 1971
3,575,435
3 Sheets-Sheet 1
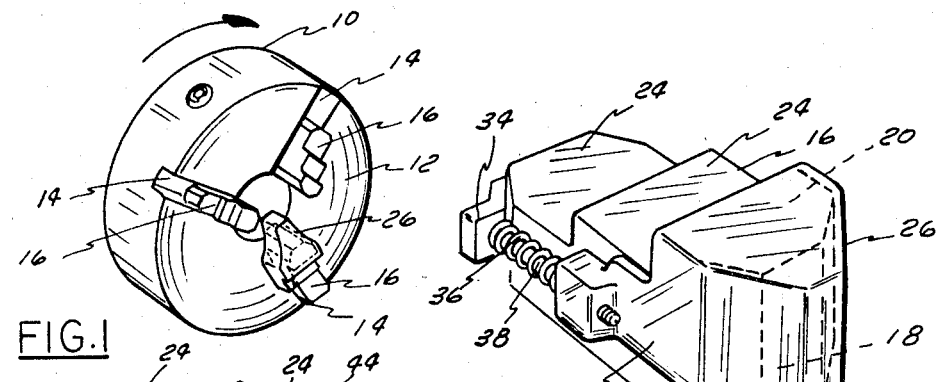
FIG.1
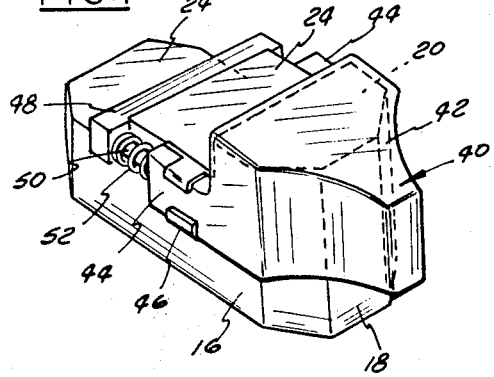
FIG.3
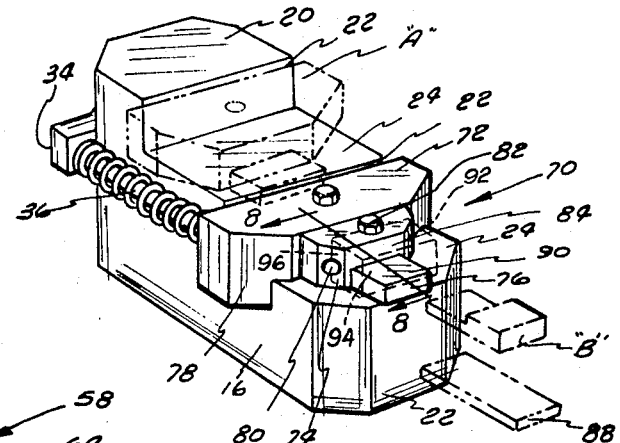
FIG.7
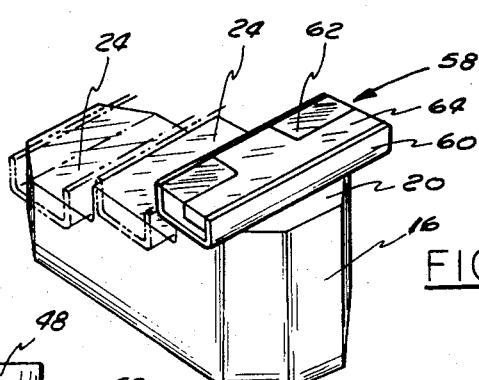
FIG.5
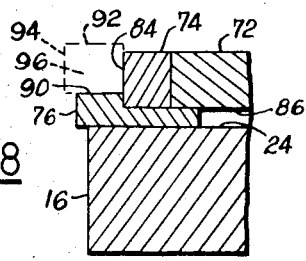
FIG.8
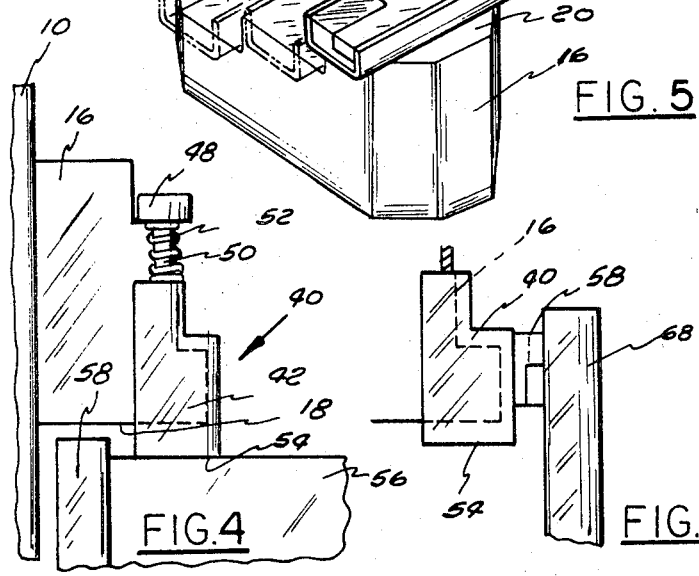
FIG.4
FIG.6
INVENTOR
SAVARIAN F. LEMANSKI
BY
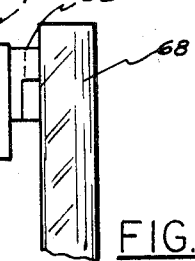
ATTORNEYS

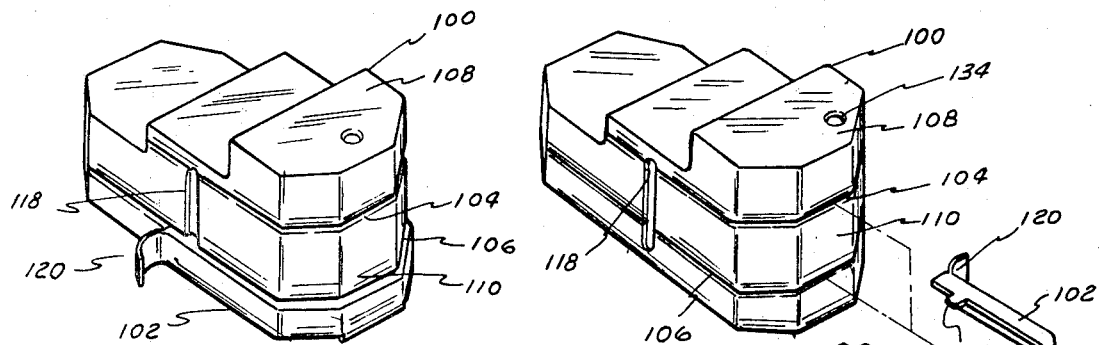
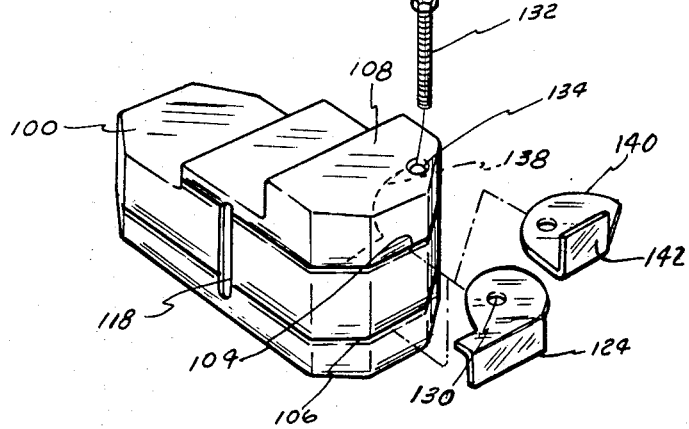
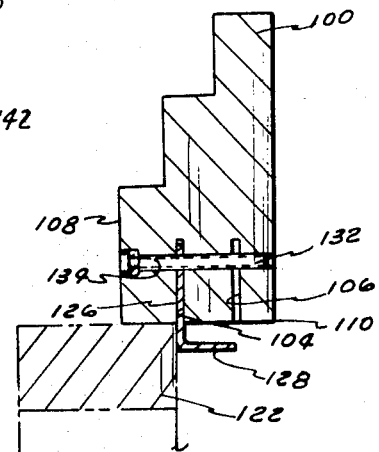
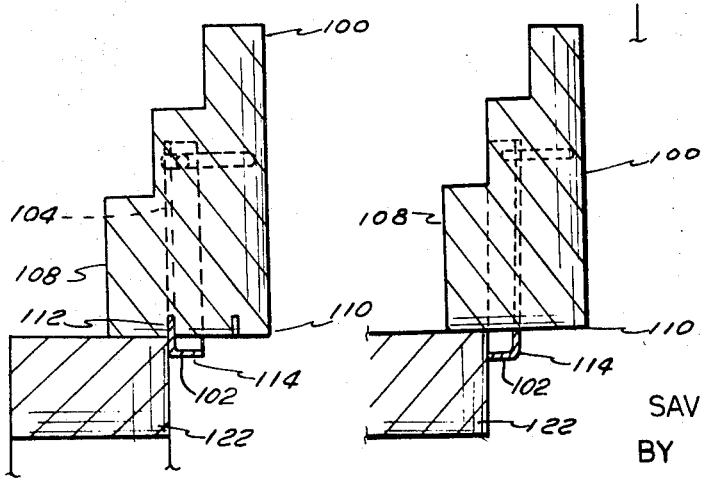
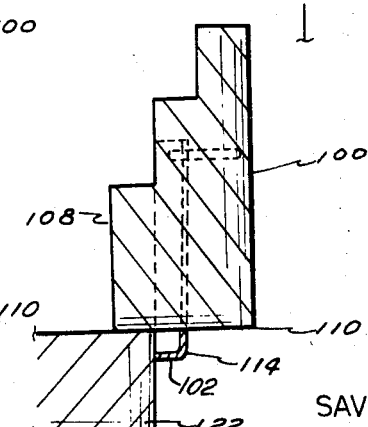
INVENTOR
SAVARIAN F. LEMANSKI Patented April 20, 1971

INVENTOR
SAVARIAN F. LEMANSKI
BY
Hauke Knaus Gifford & Patalidis
ATTORNEYS

ATTACHMENTS FOR LATHE JAWS

BACKGROUND OF THE INVENTION

This invention relates to lathes and more specifically to improved means for mounting and positioning the workpiece within the jaws of a lathe chuck.

The machining of odd-shaped workpieces in an engine lathe normally requires the fabrication of specially shaped jaws for the chuck in order to hold and rotate the work in the lathe. Such specially formed jaws are commonly referred to as soft jaws and are mounted in the chuck as a replacement for the conventional jaws of hardened steel. Soft jaws are usually formed to accommodate the shape of the particular workpiece and for this reason are expensive and normally not suited for other workpieces having a different shape.

It is the broad purpose of the present invention to provide a series of attachments which can be mounted on conventional hardened jaws for gripping and positioning workpieces having a variety of configurations.

SUMMARY

One embodiment of the invention comprises a soft jaw adapter which can be mounted on a conventional jaw of hardened steel. The soft jaw is formed of brass, a steel forging, or other suitable material and is employed where the workpiece is formed of a material that would be deformed if gripped within the hardened steel jaws of the chuck. The soft jaw attachment has a substantially hollow interior that fits over the large end or base of the hard jaw and is rigidly clamped in place by a clamping member mounted on one of the steps on the opposite side of the hard jaw. In one embodiment, the soft jaw extends the full length of the base of the hard jaw, and in another embodiment the soft jaw extends only a portion of the length of the base from the forward face of the hard jaw. This allows the soft jaw to grip the neck of a workpiece having an enlarged head which is disposed between the face of the chuck and the inner end of the soft jaw.

The soft jaw attachment is also adapted to support an adapter for engaging the end of a workpiece that cannot normally be gripped around its longitudinal sides. The adapter comprises a channel-shaped member mounted on the face of the soft jaw which supports a permanent magnet having a flat surface and a rubber gripping element having a friction surface substantially coplanar with the surface of the magnet. The friction and magnetic surfaces face toward the tailstock and contact the end of the workpiece to provide support in a direction parallel to the axis of rotation of the workpiece. The magnetic portion of the adapter assists in engaging workpieces formed of magnetic materials and the rubber element of the adapter assists in gripping nonmagnetic materials. By providing suitable mounting holes in the hard jaw, the adapter can be mounted directly on the face or any of the steps of the hard jaw.

In another form of the invention, a shim is adapted to be mounted on one of the steps of the hard jaw and rigidly clamped in a position to engage the inner diameter of a circular workpiece so that the outer surface of the workpiece can be machined. The shim has a thickness which is less than the height of the step so that when the workpiece is mounted on the shim, its outer surface extends above the adjacent step so that during the machining operation, the jaw does not interfere with the motion of the tool. The shims are normally provided in sets, each element of the set having a predetermined thickness so that the shims can be stacked on the jaw in an arrangement that accommodates the thickness of the workpiece.

Another shim which forms part of the set acts as a stop member for positioning the end of the circular workpiece. This latter, stop shim is employed where the longitudinal thickness of the workpiece is less than the depth of the step so that the end face of the workpiece does not clear the step of the jaw. Thus the stop shim has a thickness chosen so that when mounted on the step, one end of the workpiece abuts the stop shim and its opposite end clears the step so that the jaw does not interfere with the motion of the cutting tool as it cuts the open face of the workpiece.

Another embodiment of the invention comprises a sheet metal stop member that can be mounted in any of a plurality of selected positions on the hardened jaw so as to position the end of the workpiece in the jaws. In this form of the invention, the sides and work-gripping base of the jaws are provided with a series of spaced slots that extend parallel to the face of the chuck. The stop member is formed with a V-shaped cross section with one leg of the V being inserted in one of the slots section so that the other leg of the V extends substantially parallel to the gripping surface of the jaw. The stop members are provided in pairs. When mounted, the outer leg of one stop member is bent toward the face of the jaw. When the second of the pair is mounted, its outer leg is bent away from the face of the jaw. Each stop member is retained to its jaw by a bolt that extends through a tapped hole extending from the forward face of the jaw which intersects each of the slots and an opening in the inserted leg of the stop member. This form of stop is also shown for positioning a workpiece between the jaws of a vise.

Another form of stop member also has a V-shaped cross section, is elongated and bent into a generally U-shaped configuration so that its midsection extends across the work-gripping base of the jaw with its legs being engaged in the ends of the mounting slot which run up the sides of the jaw. The outer end of each leg has an inwardly directed tab which is received by a socket in the side of the jaw, and a bent section which provides a handle so that the operator can separate the stop from the jaw merely by spreading the legs away from the sides of the jaw. This form of the preferred positioning stop can be mounted in alternative positions in each of the slots so as to provide a number of positioning abutments in each slot. Thus, where the jaw has two mounting slots, a single stop member can provide four different positioning abutments for the workpiece. When provided in a kit each stop has legs of different lengths in order to increase the number of positions in which the workpiece can be mounted.

In addition to their easy and convenient fastening on the hard jaws, the several attachments are relatively inexpensive, obviate the need and necessity for specially formed soft jaws, and because of their interchangeability, greatly expand the capability of conventional hard jaws and work-clamping vises.

Still other objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a perspective view of a standard lathe chuck employing conventional hardened jaws with one of the jaws supporting a soft jaw attachment made in accordance with the invention;

FIG. 2 is an enlarged perspective view of a hard jaw with one form of the preferred soft jaw attachment, FIG. 3 is a perspective view showing a shortened soft jaw attachment mounted on a hard jaw;

FIG. 4 is an elevational view showing the manner in which the shortened soft jaw attachment of FIG. 3 can be adapted to support a workpiece having an enlarged head;

FIG. 5 is a view of a hard jaw with an adapter for engaging the end face of a workpiece;

FIG. 6 is a fragmentary elevational view showing another arrangement in which the adapter of FIG. 5 can be mounted to support the end face of a workpiece;

FIG. 7 is a perspective view showing a conventional hard jaw having a set of the preferred shim means mounted on one of its steps;

FIG. 8 is a fragmentary elevational view in section showing the manner in which the shim means of FIG. 7 are employed to support a ring-shaped workpiece and taken along line 8-8 of FIG. 7;

FIG. 9 is a perspective view showing a hard jaw with a stop member embodying the invention and mounted in one of its alternative positions;

FIG. 10 is a view similar to FIG. 9 but with the stop member separated from the jaw;

FIG. 11 is a view showing the manner in which the stop member of FIG. 9 is employed to position the workpiece in one of its alternative mounting positions;

FIG. 12 is a view showing the stop member of FIG. 9 in its reversed position for abutting the workpiece;

FIG. 13 is an exploded view showing a preferred pair of stop members which is intended to be bolted to the hardened jaw;

FIG. 14 is a fragmentary elevational view in section showing one of the stop members of FIG. 13 mounted in position;

DESCRIPTION OF THE PREFERRED EMBODIMENT

Figure 15:
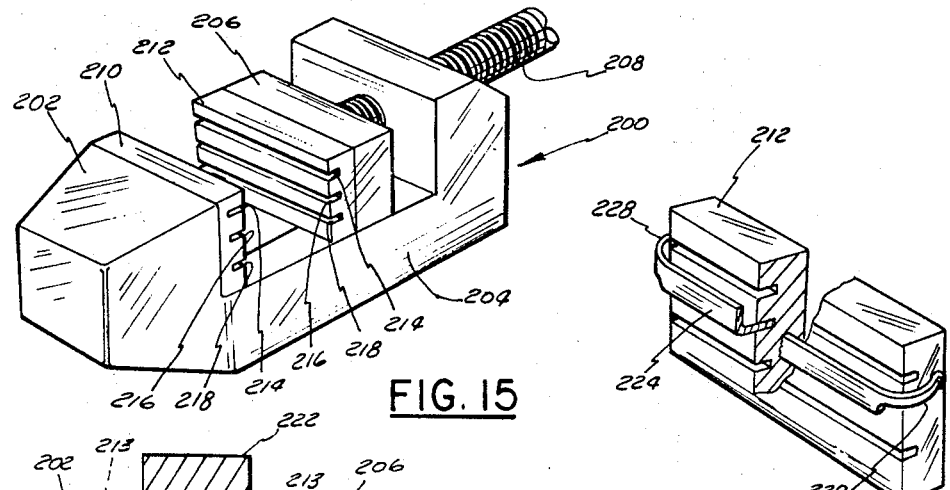
FIG. 15 shows a conventional clamping vise provided with inserts for mounting sheet metal stops embodying the invention.

Referring to the drawing, FIG. 1 illustrates a conventional three-jaw lathe chuck 10 having a face 12 which is normally mounted in a lathe (not shown) for rotation about an axis which is generally perpendicular to the face 12. The chuck 10 has radial slots 14 in which are mounted conventional stepped, hardened steel jaws 16. The hard jaws 16 are supported in the slots 14 for adjustable positioning relative to the axis of rotation of the chuck in order to accommodate work having different diameters. The jaws may be adjusted independently of each other, or adjusted together, depending on the particular chuck construction, the invention being applicable to either type of chuck as well as to other forms of work-holding mechanisms.

The hard jaws 16 are similar to one another so that a description of one of the jaws will apply to the other jaws. Each jaw 16 is normally formed with a base having a work-gripping surface 18 which is mounted generally perpendicular to the face of the chuck so that when the jaws are mounted as illustrated in FIG. 1, the work-gripping surfaces 18 are generally opposed to one another. Each jaw has a face at 20 which is generally parallel to the face 12 of the chuck and a series of steps, each having a base surface 22 providing a work-gripping surface that is substantially parallel to the work-gripping surface 18 and a riser surface 24 which is perpendicular to the base surfaces and parallel to the face 12 of the chuck.

The hard jaws 16 are preferably formed of a hardened steel so that on work of some softer types of material they tend to deform the work when the material is gripped between the jaws. A soft jaw attachment 20 is shown as being mounted on one of the jaws 16 in FIG. 1, however, it is to be understood that normally a similar soft jaw will be mounted on each of the hard jaws 16.

As best seen in FIG. 2. the soft jaw 26 has a shell-like configuration including a body 28 which extends the full length of the work-gripping surface 18 of the hard jaw 16. The body 28 has a thickened base with a work-gripping surface 30 mounted parallel to the work-gripping surface 18 of the hard jaw. The body 28 has a pair of arms 32 (only one of which is shown) which straddle the sides of the hard jaw 16 and extend toward the topmost step on the opposite side of the jaw. A clamping member 34 is mounted over the head of the jaw 16 with its ends extending beyond the sides of the jaw to permit a pair of draw bolts 36 (only one of which is shown) to connect each arm 32 of the soft jaw with one of the ends of the clamping member so that the soft jaw 26 is rigidly clamped on the hard jaw 16.

A release spring member 38, wrapped around each of the drawbolts 36 between its connection with the clamping member 34 and the arm 32 of the soft jaw, is tensioned when the soft jaw is clamped in position so that when the drawbolt is loosened to remove the soft jaw 26 from the hard jaw 16, the spring 38 assists in separating the clamping member 34 from the soft jaw 28.

The soft jaw 28 is formed of any suitable, relatively soft material such as brass, which is chosen to accommodate the particular material of the workpiece so that when the workpiece is clamped in the chuck by the soft jaws, it is not deformed by the clamping pressure.

FIG. 3 illustrates another preferred soft jaw 40 which is also formed of a relatively soft material such as brass and has a hollow body 42 which receives the base of the hard jaw 16 and covers only a portion of the work-gripping surface 18 of the jaw 16. The soft jaw 40 also has a pair of arms 44 which extend up the sides of the hard jaw 16.

A shim 46 is wrapped around each of the arms 44 so that the soft jaw snugly fits the hard jaw 16. A clamping member 48 is mounted on the base surface 22 of the middle step of the hard jaw 16 and has its ends extending beyond the sides of the hard jaw so that a pair of drawbolts 50 can connect the clamping member 48 to the arms 44 of the soft jaw 40 to rigidly mount the soft jaw on the hardened jaw 16. A release spring 52 wrapped around each drawbolt 50 between the clamping member 48 and the arms 44 of the soft jaw assist the operator in separating the clamping member 48 and the soft jaw 40 from the hard jaw 16.

The shortened soft jaw 40 illustrated in FIG. 3 provides a special advantage when employed with a conventional hard jaw which can best be described with reference to FIG. 4. The body 42 of the soft jaw has a thick base with a work-gripping surface 54 adapted to engage the collar of a workpiece 56 having an enlarged head 58 which normally cannot be gripped between the hard jaws.

The base of the soft jaw has a sufficient thickness so that its rear face, the work-gripping surface 18 of the hard jaw 16, and the face of the chuck 10 provide an annular groove which accommodates the head 58 of the workpiece. Thus the workpiece 56 can be clamped to the chuck in a manner that is not available by using standard hard jaws alone.

In summary, the two forms of the preferred soft jaws provide an attachment for conventional hard jaws that can be easily, conveniently and quickly attached to the hard jaws for handling work of a relatively soft material, and in addition, the shortened form of the soft jaw attachment provides means for adapting conventional hard jaws to grip work having an enlarged end section or head.

Now referring to FIG. 5 another attachment for a conventional hardened jaw 16 is illustrated as comprising an adapter 58 comprising a channellike holder 60 having a permanent magnet section 62 mounted and slotted to accommodate a T-shaped rubber element 64 which provides a friction surface substantially coplanar with the surface of the magnet 62. The holder is adapted to be attached by suitable means (not shown) such as a bolt carrier by the channel 60 received by a tapped hole in the jaw 16 so that the adapter 58 can be mounted on the face 20 of the jaw or any of the steps of the jaw. One of the adapters 58 is normally mounted on each of the jaws 16 so that the flat surfaces of the magnet 62 and the rubber element 64 can butt up against the end surface of a workpiece which cannot be gripped between the hard jaws in the normal manner. The adapter 16 can also be mounted on the soft jaw attachment 40 as shown in FIG. 6 to grip the end face of a workpiece 68 to provide support parallel to the axis of rotation of the workpiece.

FIG. 7 illustrates another attachment for the conventional hard jaw 16 which comprises shim means generally indicated at 70. The shim means 70 include a first shim member 72, a second smaller shim member 74 which is stacked on top of the shim member 72, and a third stop shim member 76.

The shim member 72 is a blocklike element mounted on a base surface 22 of the step and has a pair of locating shoulders 78 which position the shim member 72 on the jaw 16. The jaws 78 are in turn connected by the drawbolts 36 to the clamping member 34 so that the shim member 72 is rigidly attached to the jaw 60. The smaller shim member 74 is mounted on the shim member 72 and attached to the shim member 72 by fastener means 80. Fastener means 82 rigidly secures the shim member 74 to the jaw 16. The shim member 74 has a gripping surface 84 which is generally parallel to the base surface 22 and is spaced below the top of the jaw.

The shim members 72 and 74 have a predetermined thickness and are adapted to be mounted either as a pair of illustrated in FIG. 7, or the shim member 72 alone as shown in phantom in FIG. 7 on lower step as at "A." The particular arrangement depends on the thickness of the workpiece.

Referring to FIG. 8, the shim member 76 is seated in socket 86 formed by a slot in the rear face of the shims 72 and 74 and has an enlarged head which is seated on the gripping surface 84 of the shim 74. The general shape of the shim 76 is illustrated in phantom in FIG. 7 at "B."

When the shim 72 is employed alone, a shim 88, indicated in phantom in FIG. 7, is employed. Thus the shims 76 and 88, in their respective setups, provide stop means for positioning the end of the workpiece with respect to the jaw. For this purpose, the shim 76 has a stop surface 90 which is generally perpendicular to the work-gripping surface 84 of the shim 74.

As best seen in FIG. 8, the shim member 74 and the shim member 76 provide a secondary step for mounting a ring-shaped workpiece having a section 92 with a thickness less than the height and depth of the steps of the hard jaw 16 so that when mounted on the hard jaw without the shims, the surfaces of the hard jaw interfere with the cutting motion of the cutting tool. By employing the preferred shims, the workpiece 92 can be mounted so that its outer surface 94 is above the head or adjacent step of the hard jaw 16 and its end face 96 extends beyond the base surface of the step so that the workpiece can be machined by the tool without interference with the jaw.

In a similar manner, when the shim 72 is mounted on one of the steps without the shim 74, the shim 88 provides stop means for engaging and positioning the end face of the workpiece so that it can be machined by the tool without interference between the motion of the tool and the surfaces of the hard jaw 16.

Now referring to FIGS. 9 and 10, a conventional hard jaw 100 is illustrated which is similar to the hard jaw 16 with the exception of certain modifications for mounting a novel stop member. In FIGS. 9 and 10 the stop member is illustrated at 102 as formed of sheet metal such as spring steel with a U-shaped configuration. The top member 102 has a V-shaped cross section which best seen in FIGS. 11 and 12. The hard jaw 100 is provided with a pair of slots 104 and 106 which extend generally parallel to the forward face 108 of the jaw, up both sides of the jaw and across the work-gripping surface of its base 110. The slots 104 and 106 are adapted to receive a side 112 of the stop member so that its outer outer side 114 is generally perpendicular to the face of the chuck in which the jaw is mounted as well as substantially parallel to the base surface 110. Each leg of the stop 102 has an inwardly directed tab 116 which is receivable in a slot 118 formed on each side of the jaw. Each slot 118 functions as a socket into which the tabs 116 are engaged to mount the stop member in position. The outer end of each leg terminates in a bent section 120 to form a handle so that the operator can separate the stop member 102 from the jaw 110 by grasping the handles and spreading the legs so that the tabs 116 separate from their respective sockets 118.

Thus it can be seen that the stop member 102 is essentially a one-piece stop element that can be quickly and easily mounted in place and is engagable in each of the slots 104 and 106 in alternative positions. In one position, as illustrated in FIG. 11, the elbow of the stop extends across the work-gripping surface 110 of the jaw so that it provides an abutment for the end face of a workpiece 122. The stop 102 has a reversed position, illustrated in FIG. 12, in which the free edge of the side 114 provides another abutment for positioning the end face of the workpiece 122 at a different location with respect to the face of the chuck. The stop 102 provides means for consistently positioning each of a series of workpieces in a precise longitudinal position in the lathe. By mounting the stop member in the slot 106, the stop member provides two more positions in which can locate the end of the workpiece 122.

Now referring to FIGS. 13 and 14, another preferred stop member 124 is illustrated for mounting in either of the slots 104 or 106 of the modified jaw 100. The stop 124, as can best be seen in FIG. 14, also has a V-shaped cross section with one leg 126 normally being inserted in one of the slots so that the other leg 128 is substantially parallel to the base surface 110 of the jaw. The leg 126 of the stop member has an aperture 130 for receiving an elongated locking screw 132 which is mounted in a countersunk, tapped hole 134 extending from the face 108 of the jaw so as to intersect both of the slots 104 and 106. The head of the screw 132 is formed with a lip 135 to allow a pair of pliers (not shown) to remove the screw from its countersunk hole 134.

Thus shown in FIG. 13, the legs of the stop member 124 are offset so that the apertured leg can be seated in a contoured portion 138 of each slot which is formed on the side of the hard jaw. When the stop member 124 is mounted on the jaw, its outer leg is located substantially in the center of the base of the jaw. This form of the preferred stop is intended to be usually provided in a pair which includes a second stop member 140 also having offset legs with the outer leg 142 being bent in the opposite direction with respect to the leg of the stop member 124.

In FIG. 14, the stop member 124 is shown attached by the locking screw 132 with the elbow between the outer leg 128 and the body of the stop providing an abutment surface for positioning the end face of the workpiece 122.

FIGS. 15 to 19 illustrate the manner in which modified forms of the preferred stops can be mounted in a conventional work-clamping vise generally indicated at 200 for positioning the workpiece for a machining operation in which the work cannot be fully received within the jaws of the vise. The vise 200 includes a fixed jaw 202 forming an integral part of the body 204 of the jaw, and a movable jaw 206. A screw means 208 connects the movable jaw 206 to the body 204 and is adapted to move the movable jaw 206 toward the fixed jaw 202 to clamp work between them. In this form of the invention, a pair of inserts 210 and 212 are mounted on the opposed work clamping faces of the jaws 202 and 206, respectively, and secured in place by threaded fasteners 213. The two inserts when mounted in place have opposed pairs of slots 214, 216 and 218, each pair being at a different height from the base surface of the vise on which the movable member slides.

Figure 16:
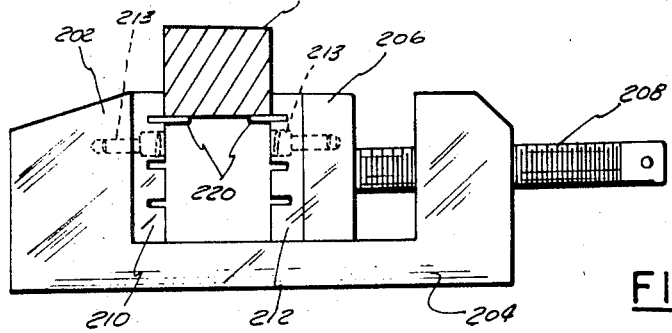
FIG. 16 shows a sectional view of one form of positioning stop mounted in the inserts of FIG. 15.

Referring to FIG. 16, one preferred stop means comprises a pair of elongated stop members 220 formed of strips of steel or the like mounted in one of the pairs of the slots in the inserts. As shown in FIG. 16, the stops 220 are mounted in the upper pair of slots 214 so that a workpiece 222 can be positioned and clamped between the opposed faces of the inserts 210 and 212 so that a portion of the workpiece extends above the jaws of the vise for a machining operation. The stops 220 can be easily mounted in any of the pair of slots and provide means for consistently positioning a series of workpieces in a precise position between the jaws of the vise.

Figure 19:
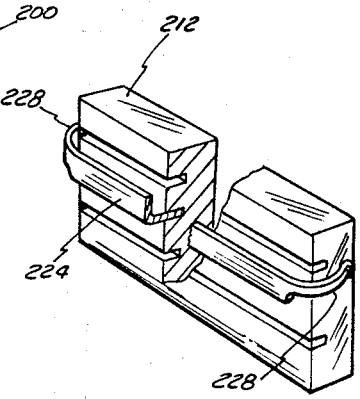
FIG. 19 shows a pair of magnetic stops attached to the inserts of FIG. 15 for positioning a workpiece.
Figure 17:
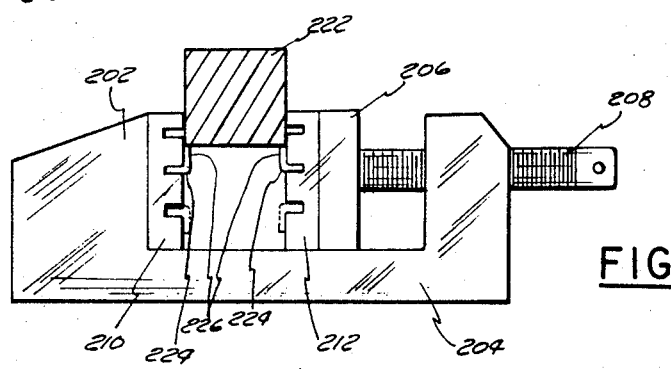
FIG. 17 shows a sectional view of another form of positioning stop mounted in the inserts of FIG. 15.

FIGS. 17 and 19 illustrate another preferred pair of stops 224 which can also be mounted in a selected pair of slots in the inserts 210 and 212. The stops 224 have upwardly bent sides 226 and are adapted for mounting in the inserts in reversed positions. In one position, as shown in FIG. 17, the workpiece is positioned in abutment with the edge of the leg 26. In the other position, the stops 224 are reversed with legs 226 extending downwardly so that the workpiece is positioned in abutment with the elbows of the two stops.

FIG. 19 illustrates the manner in which the two stops 224 are retained in position on their respective inserts. The stops each have a pair of resilient bent ends 228 which wrap around the sides of the inserts and retain them in position. This allows the operator to quickly attach or detach the stops with respect to the inserts.

Figure 18:
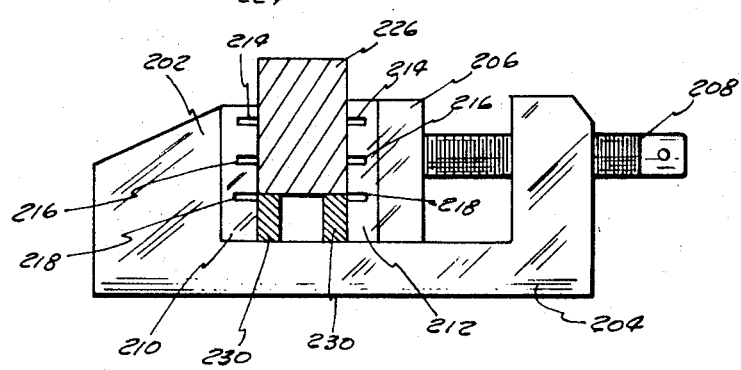
FIG. 18 shows how the stops of FIG. 17 are retained on the insert.

FIG. 18 shows still another means for accurately positioning the workpiece 226 between the jaws 202 and 206 of the vise so that a portion of the workpiece extends above the vise. In this form of the invention, a pair of magnetic blocks 230 are mounted between the inserts with the workpiece being seated in abutment with their upper surfaces. In this form of the invention, the magnetic blocks 230 are magnetically attached to the inserts 210 and 212 so that they need not be mounted in the slots. The magnetic blocks can also be employed in a conventional vise by attaching them to the face of each of the jaws in the vise without employing the slotted inserts 210 and 212.

Thus it is to be understood that I have described in detail a number of novel attachments for conventional hard jaws for adapting the jaws to accommodate workpieces having a variety of shapes and materials that cannot normally be clamped by the hardened jaws. The soft jaw attachments can be mounted on the hard jaws in order to accommodate a workpiece of a relatively soft material or having an enlarged end section. The shim means 70 provide an attachment for the hard jaws to accommodate a ring-shaped workpiece having a relatively thin radial and longitudinal thickness compared to the depth and height of the steps of the jaws.

The adapter 58 provides an attachment so that the jaws can provide endwise support for a workpiece that cannot be gripped about its longitudinal surfaces. The stop members 102 and 124 provide a one-piece stop element that can be easily mounted in a modified jaw to provide alternative positioning surfaces for contacting a workpiece in a lathe. Modified forms of the sheet metal stops can also be mounted between the clamping jaws of a conventional vise.

Although I have described several embodiments of my invention, it is to be understood that various changes and revisions can be made therein without departing from the spirit of the invention as expressed in the scope of the appended claims.

I claim:

1. In a lathe chuck adapted for rotation about an axis and having a set of hard jaws mounted on a face perpendicular to its axis of rotation for supporting a workpiece, each of said hard jaws having a work-gripping surface generally perpendicular to the face of the chuck, the combination with each hard jaw comprising:
    a. a U-shaped work holder member having an outer surface for gripping the workpiece and an inner surface in abutment with said jaw work-gripping surface, the inner surfaces of the legs of said U-shaped work holder member being in abutment with the opposite sides of said jaw, said opposite sides being disposed in planes which are perpendicular to said jaw-gripping surface,
    b. an elongated clamping member mounted on another side of said jaw, said last-mentioned side being parallel to said jaw-gripping surface, and
    c. drawbolt means adjacent to said jaw on said opposite sides thereof connecting said work holder member and said clamping member for drawing them toward one another thereby fixably mounting the work holder member in position on said jaw, said legs of said U-shaped member being generally perpendicular to said draw drawbolt means.

2. In a lathe chuck adapted for rotation about an axis and having a set of hard jaws mounted on a face perpendicular to its axis of rotation for supporting a workpiece, each of said hard jaws having a work-gripping surface generally perpendicular to the face of the chuck, the combination with each hard jaw comprising:
    a. workholder member having an outer surface for gripping the workpiece and an inner surface in abutment with the surface on one side of said jaw;
    b. an elongated clamping member mounted on another side of said jaw;
    c. drawbolt means adjacent to said jaw on opposite sides thereof connecting said work holder member and said clamping member for drawing them toward one another thereby fixably mounting the work holder member in position on said jaw; and
    d. said hard jaw having a step on its side opposite the side with the work-gripping surface, said step having a base surface generally parallel to the work-gripping surface, and a riser surface, perpendicular to the base surface, said clamping member being mounted in abutment with the work-gripping surface of the hard jaw, and wherein said workholder comprises a first shim mounted on the base surface of said step in abutment with said riser surface, said first shim member having a predetermined thickness less than the length of said riser surface with a work-gripping surface which is parallel to said base surface and adapted for engaging a workpiece, and an opening in said work-gripping surface adjacent to said riser surface forming a socket; and a second shim member having one end mounted in said socket and its other end extending above the work-gripping surface of the first shim member; said other end having a stop surface perpendicular to said work-gripping surface and cooperating with said first shim member to form a secondary step for engaging and positioning a workpiece.

3. The combination as defined in claim 2, wherein said work holder member comprises a soft jaw attachment having an inner, generally hollow portion for receiving the base of the hard jaw, and an outer surface contoured for gripping the workpiece, said soft jaw attachment being formed of a material relatively soft as compared to said hard jaw to accommodate the workpiece.

4. In a lathe having a chuck adapted for rotation about an axis and a jaw mounted in said chuck for supporting a workpiece, said jaw having a step formed on one side with a base surface of a selected length and generally perpendicular to the face of said chuck, and a riser surface of a selected length and generally perpendicular to said base surface, the combination comprising:
    a first shim member having a blocklike shape and being mounted on the base surface of said step in abutment with said riser surface, said first shim member having a predetermined thickness less than the length of said riser surface with a work-gripping surface which is parallel to said base surface and adapted for engaging a workpiece, and an opening in said work-gripping surface adjacent to said riser surface forming a socket; and a second shim member having one end mounted in said socket and its other end extending above the work-gripping surface of the first shim member; said other end having a stop surface perpendicular to said work-gripping surface and cooperating with said first shim member to form a secondary step for engaging and positioning a workpiece.

UNITED STATES PATENT OFFICE
CERTIFICATE OF CORRECTION

Patent No. 3,575,435                          Dated   April 20, 1971

Inventor(s)  Savarian F. Lemanski

It is certified that error appears in the above-identified patent and that said Letters Patent are hereby corrected as shown below:

Page 1, change the address of the inventor to:

109 Taylor
                Detroit, Michigan

Signed and sealed this 25th day of April 1972.

(SEAL)
Attest:

EDWARD M. FLETCHER, JR.        ROBERT GOTTSCHALK
Attesting Officer              Commissioner of Patents